United States Patent [19]

Strachan

[11] Patent Number: 4,600,855
[45] Date of Patent: Jul. 15, 1986

[54] PIEZOELECTRIC APPARATUS FOR MEASURING BODILY FLUID PRESSURE WITHIN A CONDUIT

[75] Inventor: J. Scott Strachan, Edinburgh, Scotland

[73] Assignee: Medex, Inc., Hilliard, Ohio

[21] Appl. No.: 739,188

[22] Filed: May 30, 1985

Related U.S. Application Data

[63] Continuation-in-part of Ser. No. 715,136, Mar. 22, 1985, which is a continuation-in-part of Ser. No. 653,978, Sep. 24, 1984.

[30] Foreign Application Priority Data

Sep. 28, 1983 [GB] United Kingdom ............... 8325861

[51] Int. Cl.⁴ ........................................... H01L 41/08
[52] U.S. Cl. ..................................... 310/338; 73/702; 73/704; 73/715; 73/754; 310/321; 310/323; 310/800; 128/675; 128/691
[58] Field of Search ............... 310/321, 323, 338, 800, 310/334, 335; 73/DIG. 4, 702, 704, 715, 716, 717, 753, 754; 128/637, 645, 675, 687, 689–692, 900

[56] References Cited

U.S. PATENT DOCUMENTS

| | | |
|---|---|---|
| 2,558,563 | 6/1951 | Janssen . |
| 3,327,533 | 6/1967 | Kooiman ..................... 310/323 X |
| 3,365,593 | 1/1968 | Roof et al. . |
| 3,381,525 | 5/1968 | Kartluke et al. ............... 310/323 X |
| 3,470,400 | 9/1969 | Weisbord ..................... 310/15 |
| 3,479,536 | 11/1969 | Norris . |
| 3,489,161 | 1/1970 | Rexford . |
| 3,733,890 | 5/1973 | Landvogt . |
| 3,750,127 | 7/1973 | Ayers et al. . |
| 3,792,204 | 2/1974 | Murayama et al. . |
| 3,798,473 | 3/1974 | Murayama et al. . |
| 3,798,474 | 3/1974 | Cassand et al. . |
| 3,894,243 | 7/1975 | Edelman et al. . |
| 3,903,733 | 9/1975 | Murayama et al. . |
| 3,931,446 | 1/1976 | Murayama et al. . |
| 3,976,897 | 8/1976 | Tamura et al. . |
| 3,982,143 | 9/1976 | Tamura et al. . |
| 4,008,408 | 2/1977 | Kodama . |
| 4,045,695 | 8/1977 | Itagaki et al. . |
| 4,047,998 | 9/1977 | Yoshikawa et al. . |
| 4,048,526 | 9/1977 | Taylor . |
| 4,051,395 | 9/1977 | Taylor . |
| 4,089,927 | 5/1978 | Taylor . |
| 4,158,678 | 6/1979 | Tatemoto et al. . |
| 4,170,742 | 10/1979 | Itagaki . |
| 4,175,243 | 11/1979 | Corbett . |
| 4,186,323 | 1/1980 | Cragg et al. . |
| 4,191,193 | 3/1980 | Seo . |
| 4,193,010 | 3/1980 | Kompanek ............. 310/321 X |
| 4,215,570 | 8/1980 | Eer Nisse ............... 310/338 |
| 4,216,403 | 8/1980 | Krempl et al. . |
| 4,227,111 | 10/1980 | Cross et al. . |

(List continued on next page.)

FOREIGN PATENT DOCUMENTS

1345396 1/1974 United Kingdom .
0979903 12/1982 U.S.S.R. ......................... 310/338

OTHER PUBLICATIONS

P. Cario et al., *Touch-Sensitive Polymer Skin Uses Piezoelectric Properties to Recognise Orientation of Objects*, Sensor Review (Oct. 1982), pp. 194–198.
McGraw-Hill Encyclopedia of Science and Technology, vol. 10, pp. 216–223 (1960).

*Primary Examiner*—Mark O. Budd
*Attorney, Agent, or Firm*—Wood, Herron & Evans

[57] ABSTRACT

An apparatus for measuring pressure within a conduit is disclosed preferably comprising a tube whose resonant frequency varies with the pressure of fluid within the tube; means for passing the fluid to be measured through the tube; two active piezoelectric films disposed in intimate contact with the tube on opposite sides thereof; first electronic means for energizing the first of the films to cause the tube to resonate at its natural frequency, and second electronic means connected to the other of the films to monitor the frequency of the tube.

20 Claims, 8 Drawing Figures

U.S. PATENT DOCUMENTS

| | | | |
|---|---|---|---|
| 4,241,128 | 12/1980 | Wang . | |
| 4,242,541 | 12/1980 | Ando . | |
| 4,265,841 | 5/1981 | Fujimori et al. . | |
| 4,284,921 | 8/1981 | Lemonon et al. . | |
| 4,286,459 | 9/1981 | Trimmer et al. . | |
| 4,295,010 | 10/1981 | Murphy . | |
| 4,296,349 | 10/1981 | Nakanishi et al. . | |
| 4,298,719 | 11/1981 | Mizuno et al. . | |
| 4,327,153 | 4/1982 | Micheron . | |
| 4,330,730 | 5/1982 | Kurz et al. . | |
| 4,356,422 | 10/1982 | van Maanen . | |
| 4,359,726 | 11/1982 | Lewiner et al. . | |
| 4,360,562 | 11/1982 | Endo et al. . | |
| 4,368,525 | 1/1983 | Obata et al. . | |
| 4,369,391 | 1/1983 | Micheron . | |
| 4,383,194 | 5/1983 | Ohigashi et al. . | |
| 4,384,394 | 5/1983 | Lemonon et al. . | |
| 4,390,674 | 6/1983 | Ward et al. . | |
| 4,395,652 | 7/1983 | Nakanishi et al. . | |
| 4,400,642 | 8/1983 | Kiraly . | |
| 4,406,059 | 9/1983 | Scott et al. . | |
| 4,406,966 | 9/1983 | Paros | 310/321 |
| 4,413,202 | 11/1983 | Krempl et al. . | |
| 4,416,269 | 11/1983 | Enomoto et al. . | |
| 4,424,465 | 1/1984 | Ohigashi et al. . | |
| 4,425,526 | 1/1984 | Mont | 310/338 X |
| 4,427,609 | 1/1984 | Broussoux et al. . | |
| 4,435,475 | 3/1984 | Sasaki et al. . | |
| 4,435,666 | 3/1984 | Fukui et al. | 310/328 |
| 4,438,364 | 3/1984 | Morison . | |
| 4,439,705 | 3/1984 | Corbett | 310/338 |
| 4,512,198 | 4/1985 | Sinha et al. | 310/338 X |
| 4,544,858 | 10/1985 | Nishiguchi et al. | 310/338 X |
| 4,546,658 | 10/1985 | Rocha et al. | 310/338 X |
| 4,547,691 | 10/1985 | Valdois et al. | 310/338 X |

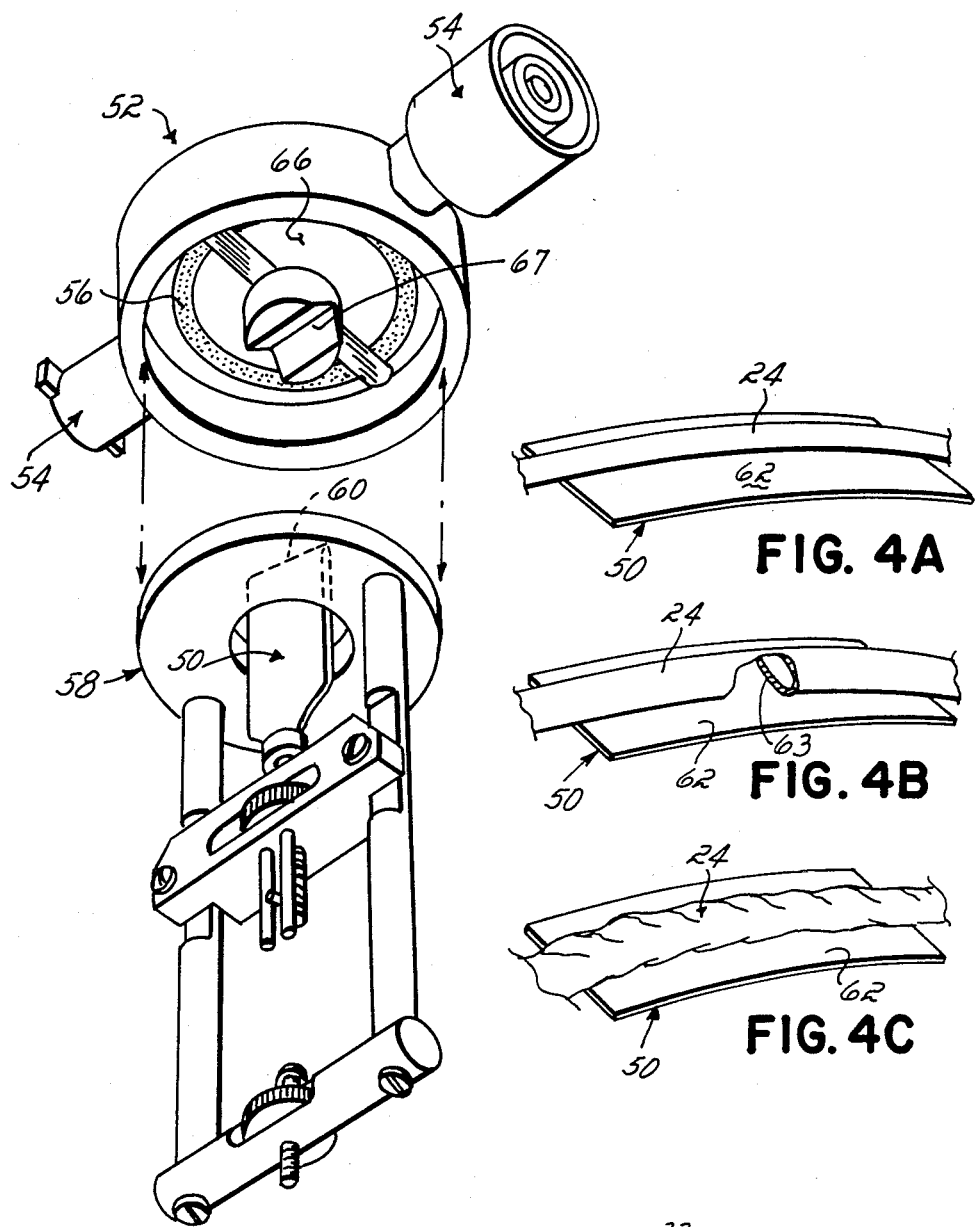
FIG. 3
FIG. 4A
FIG. 4B
FIG. 4C
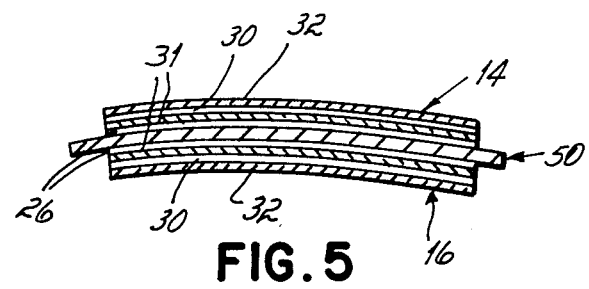
FIG. 5

4,600,855

PIEZOELECTRIC APPARATUS FOR MEASURING BODILY FLUID PRESSURE WITHIN A CONDUIT

RELATED APPLICATIONS

This application is a continuation-in-part of my earlier applications entitled "FORCE TRANSDUCER", U.S. patent application Ser. No. 715,136, filed Mar. 22, 1985 which is a continuation-in-part of my U.S. patent application Ser. No. 653,978, filed Sept. 24, 1984.

BACKGROUND OF THE INVENTION

I. Field of the Invention

This invention relates to pressure transducers which are specifically adapted for measuring bodily fluid pressure within a conduit.

II. Description of the Prior Art

Pressure within a conduit can be measured in a number of ways. Perhaps the most common is a mechanical gauge which is coupled through one wall of the conduit to the fluid pressure within the conduit. Inside the gauge, a needle is deflected over a scale in proportion to the pressure within the conduit. In some instances, the standard pressure gauge may be replaced with a transducer which converts pressure into an electrical signal which is then monitored. The present invention is, broadly speaking, of the latter transducer type.

Pressure measurement of fluids within a conduit occurs in numerous environments. The present invention is particularly concerned with measuring bodily fluid pressure within a conduit in a medical environment. For example, a patient's blood pressure, and/or intracranial pressure and the like may have to be continuously monitored.

One typical method of monitoring blood pressure is to measure the fluid pressure within an intravenous tube which is hydraulically coupled to the patient's vein. A catheter is inserted into the patient's vein and a plastic tube or conduit coupled to the catheter. A saline solution is drip-fed through the plastic tubing or conduit to maintain a pressure balance against the pressure within the patient's vein. The saline fluid acts as a hydraulic fluid to cause the pressure within the plastic tubing to correspond to the pressure within the patient's vein. Hence, by measuring the fluid pressure within the tubing, the patient's blood pressure will be known.

One known device for measuring the fluid pressure in the plastic tubing involves a two-part dome/sensor apparatus. The dome is typically a hollow replaceable structure which is inserted between two lengths of plastic tubing and secured thereto by Leur locks (which are fittings that receive and lock a standard size tubular fitting or tube carrying an intravenous solution such as saline), for example. The saline or hydraulic fluid fills (i) a portion of the tubing above the dome, (ii) the hollow within the dome, and (iii) the lower portion of the tubing which is coupled to the patient's catheter. The bottom wall or side of the dome includes a diaphragm. Releasably secured against the dome diaphragm is a sensor structure including a mating diaphragm. Any pressure within the dome results in displacement of the dome diaphragm which is transmitted to the sensor's mating diaphragm similarly displacing the mating diaphragm. An example of the foregoing is described in U.S. Pat. No. 4,252,126 assigned to the assignee herein, Medex, Inc., and incorporated herein by reference.

The mating diaphragm is mechanically coupled to an electrical sensor including a strain gauge or the like. The sensor produces a DC electrical signal corresponding to the displacement of the mating diaphragm, i.e., corresponding to the pressure in the patient's vein.

Strain gauges of various constructions and material are known. Strain gauges employed to monitor blood pressure utilize semiconductor materials such a ceramic or quartz-type piezoelectric materials. Pressure applied to the strain gauge causes the conductance of the material to change. To measure the change in conductance, the sensor's strain gauge is part of a Wheatstone bridge network, the output of which is a voltage proportional to the pressure. The bridge output is typically coupled to commercially available monitors which are adapted to provide medical personnel continuous readout of the patient's blood pressure.

Sensors typically must occasionally be "zeroed" or calibrated to atmospheric pressure thus adding complexity and/or operator involvement to the pressure monitoring process. Further, offsets due to the temperature of the environment in which the transducer is stored and/or operated may induce errors into the system which can be costly, albeit necessary, to correct. With respect to the two part dome/sensor system, the mating sensor structure and, especially, the strain gauge are quite costly.

A further drawback to the dome/sensor system is that medical personnel utilizing or operating the equipment must not only set up the hydraulic system discussed above, but must also connect the sensor to the dome and be certain that the connection is secure. Hence, operation steps are added which can be time consuming and subject to human error. Also, with the two-part system, the dome is replaceable but the sensor structure is reusable and thus should be sterilized between use, thereby increasing costs.

The medical environment for which this invention is most particularly adapted places severe limitations on many aspects of a transducer. The Association for the Advancement of Medical Instrumentation (AAMI) has proposed standards applicable to blood pressure transducers entitled "Standard for Interchangeability and Performance of Resistive Bridge Type Blood Pressure Transducers (Draft)," AAMI BPT-R (2/84) (February 1984 Revision) (Arlington, VA). A manufacturer may impose and/or use even more stringent standards. For example, the maximum fluid displacement (outward bulging of the diaphragm in the dome, e.g.) is severely restricted. Hence, potentially large pressure fluctuations must be accurately monitored over an extremely small range of displacement of a tube wall or diaphragm. Also, severe electrical constraints are placed on the equipment, such as the sensor; strict limits on electrical power levels on all devices near a patient must be observed. Further, the devices must be electrically isolated from the patients. Finally, as a practical matter, the transducer must provide repeatable and reliable measurements, particularly in view of the life-dependant nature of the environment in which they may be used.

Accordingly, it is one object of the present invention to provide a transducer for measuring bodily fluid pressure within a conduit which is low in cost of manufacture yet is of sufficient reliability to meet or exceed the restrictions placed thereon in the medical environment.

A further object of the present invention is to provide a transducer for measuring pressure within a conduit which provides a repeatable and reliable measurement without costly compensation for the effects of the temperature or the like.

An even further objective of the present invention is to replace the two part dome/sensor system with a one part transducer for measuring pressure within a conduit.

A still further objective of the present invention is to provide a transducer for measuring pressure within a conduit which is coupled to electronic circuitry adapted to generate an electrical signal compatible with currently available monitors.

Of course, many installations may prefer to retain the two part dome/sensor approach. Accordingly, a yet further object of the present invention is to provide an improved transducer for measuring the pressure within a conduit which is compatible with a two part dome/sensor system or the like and which has the above advantages without use of a strain gauge.

SUMMARY OF THE INVENTION

The various embodiments of transducers provided by the present invention are believed to achieve the above objects of the invention. Specifically, with the preferred embodiment of the transducer of the present invention, it is believed that pressure within a conduit can be measured reliability and with good repeatability. Moreover, the transducer of the present invention is believed to be manufacturable for a fraction of the cost of prior art transducers while meeting or exceeding the AAMI proposed standards.

Thus, in accordance with the present invention and in its broadest aspects, a transducer for measuring bodily fluid pressure within a conduit is provided which has a structural member having at least one natural resonant frequency which varies as mechanical stress applied to it varies. The structural member is coupled to the conduit whereby stress proportional to the bodily fluid pressure within the conduit is applied to the structural member. Coupled to respective portions of the structural member are a pair of piezoelectric transceivers. Electronic circuitry is provided for energizing one of the piezoelectric transceivers to vibrate the structural member at its resonant frequency. As pressure within the conduit increases or decreases, mechanical stress on the structural member will vary thus varying the resonant frequency of the structural member. The other piezoelectric transceiver produces a signal proportional to the frequency of vibrations of the structural member. Because the frequency of vibrations of the structural member varies as a function of the mechanical stress applied to it, which is a function of the pressure within the conduit, the signal from the second piezoelectric transceiver is indicative of the pressure within the conduit.

In the preferred embodiment of the present invention, the structural member is a tube interposed between respective portions of the conduit and defining a further portion of the conduit.

The preferred embodiment thus eliminates the two-part dome/sensor construction of the prior art.

In alternative embodiments, the structural member does not define a further portion of the conduit but rather is coupled mechanically to an outer surface of the conduit. The varying stresses on the walls of the conduit caused by varying pressure within the conduit are thus communicated to the structural member. In certain embodiments, a surface of the structural member is coupled directly to the wall of the conduit. In yet another alternative embodiment, the one wall of the conduit may be a diaphragm of a replaceable dome, as employed in the prior art, to which is coupled the structural member of the present invention.

In all embodiments of the present invention, it is preferred that the output of the second piezoelectric transceiver which produces a signal indicative of the pressure within the conduit be directly coupled through an amplifier to the first piezoelectric transceiver thereby causing the structural member to continuously vibrate at its natural resonant frequency. Further, the output of the second piezoelectric transceiver is preferably coupled to an electronic circuit which is capable of measuring the output signal and providing an electronic signal to a monitor which electronic signal is compatible with said monitor to provide a readout of the actual pressure within the conduit.

In preferred form, the electronic circuit comprises a frequency counter which measures, for a predetermined time period, the frequency of oscillations of the structural member as produced by the second piezoelectric transceiver. The output of the frequency counter is coupled to a digital-to-analog converter which provides a DC signal proportional to the frequency of oscillation of the structural member. The DC signal is the same as that produced by the prior art sensors having a strain gauge for a given pressure, thus making the transducer of the present invention an appropriate substitute for prior art systems.

By utilizing the resonant quality of a structural member, an easily and inexpensively manufactured, yet reliable, transducer is possible. Further, by selection of appropriate material, e.g., Invar or glass, for the structural member the effects of temperature are virtually eliminated and fabrication is simple. Moreover, with reference to the preferred and certain alternative embodiments, operator use is simplistic and virtually error free.

BRIEF DESCRIPTION OF THE DRAWINGS

These and other features and advantages of the invention will become more readily apparent from the following detailed description taken with the accompanying drawings in which:

FIG. 3 is a perspective view of an alternative embodiment of a transducer according to the present invention;

FIGS. 4A–4C are perspective views of further alternative embodiments of transducers according to the present invention;

FIG. 5 is a cross-sectional view of the sensor plate for use in the transducer embodiments shown in FIGS. 3 and 4A–4C.

DETAILED DESCRIPTION OF THE DRAWINGS

Figure 1:
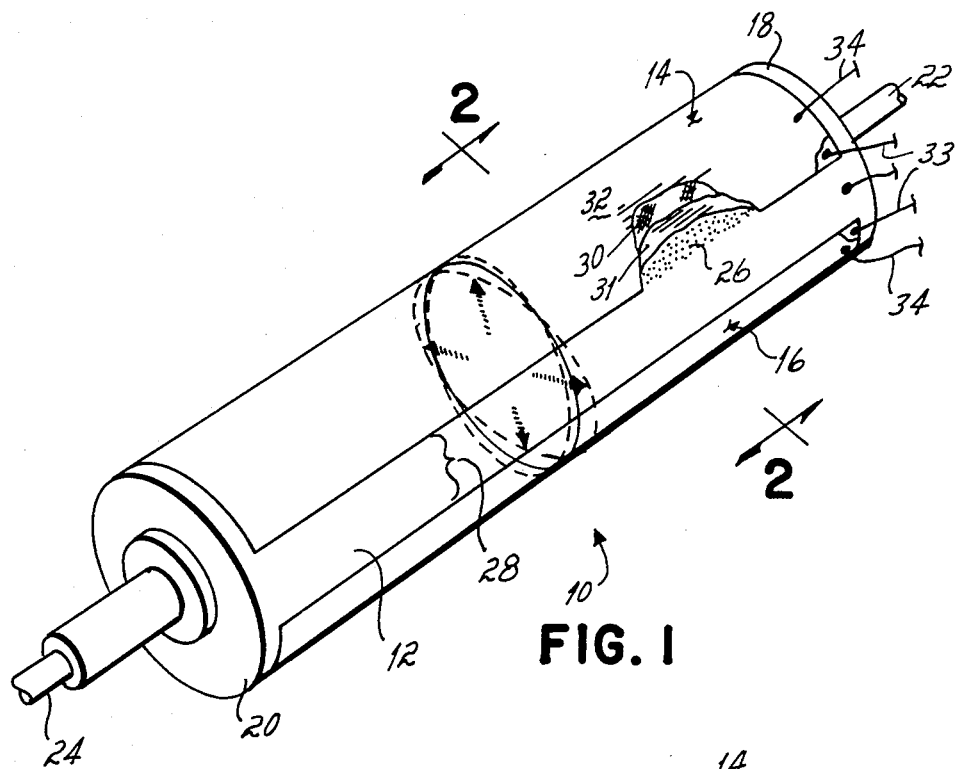
FIG. 1 is a perspective view of a preferred embodiment of a transducer according to the present invention.
Figure 2:
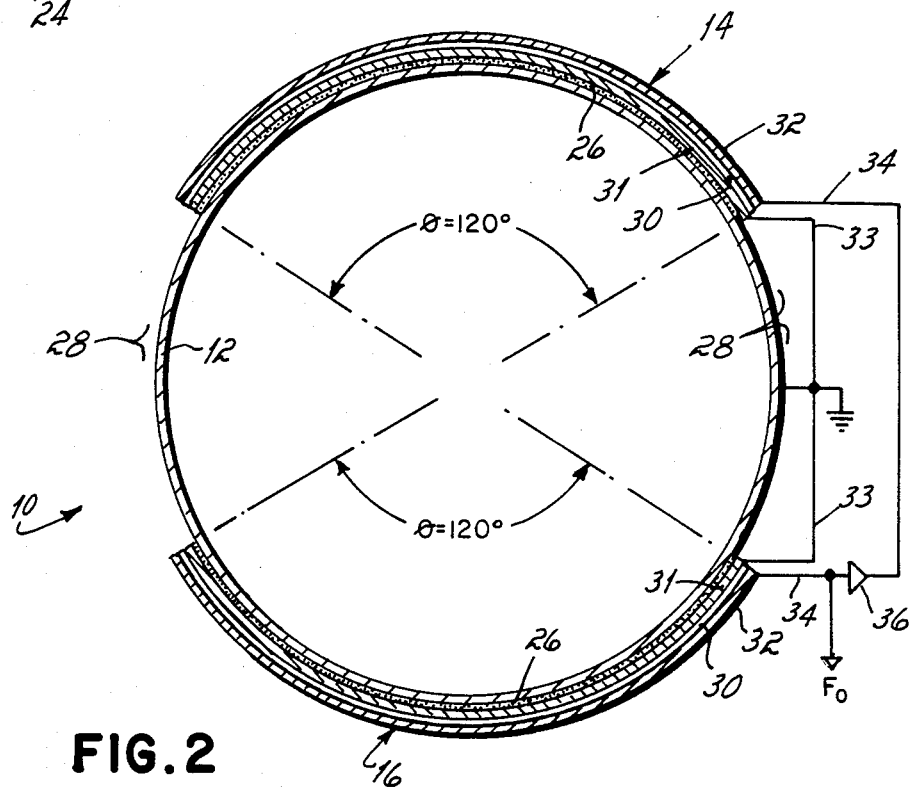
FIG. 2 is a view in cross-section of the transducer of FIG. 1 taken along line 2—2 of FIG. 1.

Referring to FIGS. 1 and 2, there is shown a preferred transducer 10 which is comprised of a cylinder 12. Adhered to the exterior of cylinder 12 are two lengths of metal coated piezoelectric resin material to form a pair of transceivers 14, 16. Disposed at opposite ends of cylinder 12 are end caps 18, 20 to facilitate coupling cylinder 12 to hydraulic lines 22, 24, respectively. In preferred form, hydraulic lines or tubing 22, 24 are constructed of materials commonly utilized for medical tubing such as for intravenous feeding (e.g., hardwalled or stiff PVC or polyethylene). Tube 22 is coupled to a source (not shown) of hydraulic fluid such as saline solution which is situated above cylinder 12. Tube 24 is coupled to a catheter (not shown) inserted into a patient's vein (not shown). The patient (not shown) is situated below the source (also not shown) to effectuate the proper flow of saline into tubes 22, 24 as is well understood.

The above-described set-up will result in a hydraulic coupling of fluid within tubes 22, 24 and cylinder 12 to the vein (not shown). Thus, as saline fluid fills the interior of tubes 22, 24 and cylinder 12, the pressure within cylinder 12 will correspond to the patient's blood pressure.

Cylinder 12 is a resilient structural member which is capable of ringing or oscillating at a natural resonant frequency under appropriate conditions. Moreover, the natural resonant frequency of cylinder 12 is sensitive to the stress on the walls thereof and therefore the resonant frequency of cylinder 12 will vary as mechanical stress applied to it varies. The sensitivity and resonant quality of cylinder 12 are advantageously utilized to monitor the pressure therein. For example, cylinder 12 and tubes 22, 24 are coextensive and cooperate to define a conduit. As the conduit is filled with fluid under pressure, the stress applied to the walls of cylinder 12 will vary. Thus, when cylinder 12 is caused to vibrate, the frequency of vibration will vary according to the pressure within the cylinder 12. By monitoring the variation in frequency, the pressure within cylinder 12 may be determined.

To cause cylinder 12 to oscillate at its natural resonant frequency, and to provide an output for monitoring purposes, cylinder 12 is provided with two piezoelectric transceivers 14, 16 which are adhesively applied by means of double sided tape or other suitable hard adhesive 26 to the outer wall of cylinder 12. Each transceiver 14, 16 is comprised of a sheet of piezoelectric resin film 30. Bonded to each side of piezoelectric resin film 30 are metal coatings 31, 32. Each coating 31, 32 has coupled to it a wire 33, 34, respectively.

In the preferred embodiment as shown in FIGS. 1 and 2, transceivers 14, 16 are shown spaced apart and applied to opposing surfaces of cylinder 12. For reasons to be explained, that configuration is preferred although the transceivers need not be opposing.

It is preferred that the resonant frequency of cylinder 12 vary nearly linearly proportionally to pressure over the range of pressures of interest in the medical environment, e.g., 0–300 mmHg. To accomplish that linearity, transceivers 14, 16 preferably each cover approximately 120° of the circle defined by the cross-section of cylinder 12, as in FIG. 2. Further, either two transceivers such as 14, 16 are provided having gaps 28 between each pair of adjacent edges as seen in FIGS. 1 and 2, or one larger film sheet 30 may be utilized with two separate active (metallized) areas corresponding to two separate transceivers. Transducers 14, 16 are also applied over most of the length of cylinder 12 as seen in FIG. 1. Other configurations may be employed but they may give rise to harmonics and patterns of oscillations which may not be desirable where linearity is sought. Further, they may interfere with proper measurement thus causing the readings obtained to be suspect.

It is desirable to minimize the active area of each transducer 14, 16 to minimize energy consumption. On the other hand, cylinder 12 is so small (in the preferred embodiment) that most of its length must be exposed to an active transceiver in order to couple sufficient energy between cylinder 12 and the transceivers for proper operation. Also, end caps 18, 20 will affect how much of the length of the surface of cylinder 12 must be covered. The stiffer the end caps, the further from them the transceivers 14, 16 should be spaced. As transceivers 14, 16 get closer to the end caps, more of this energy must be used to overcome the loading or damping affects of the end caps. Hence, if end caps 18, 20 are soft, very little damping will occur and transceiver 14, 16 may extend completely across cylinder 12 between the end caps. Whereas if end caps 18, 20 are stiff, transceivers 14, 16 should extend over only a portion of the length of cylinder 12.

As shown in FIG. 2, coating 32 of transceiver 14 is coupled to the output of operational amplifier 36 via its associated wire 34. When operational amplifier 36 is supplied with power from a power supply (not shown), transceiver 14 is energized or pulsed. Power is typically supplied by a commercial monitor (not shown) to which this invention will return a signal indicative of pressure. Alternatively, power could be supplied by any known means. Operational amplifier 36 may be any standard operational amplifier but preferably is a high impedance input amplifier such as a C-MOS amplifier to operate under low power conditions as are likely encountered in the hospital environment.

When transceiver 14 is energized with an impulse from amplifier 36, energy will be coupled to cylinder 12 inducing cylinder 12 to ring at its natural resonant frequency. Transceiver 16 will be energized by the ringing of cylinder 12 to produce an electrical signal on its associated wire 34 which signal is proportional to the frequency of ringing of cylinder 12. Coatings 31 of each transceiver are coupled together and coupled to electrical ground in the preferred embodiment although coatings 31 could be dispensed with altogether, such as if cylinder 12 is metallic or otherwise electrically conducting. If cylinder 12 is electrically conducting, it is preferably grounded as well.

The output of transceiver 16 on its output wire 34 will, in the preferred embodiment, be an AC signal whose frequency is identical to the resonant frequency of oscillation of cylinder 12. Although not necessarily critical to proper operation of the transducer, the pressure within cylinder 12 will preferably be determined by monitoring the frequency and the changes in frequency of oscillations as reproduced on transceiver 16. Other possible systems may include measurement of phase differences, for example. It is not preferred that the amplitude of the output of transceiver 16 be monitored for piezoelectric films are very sensitive to the effects of temperature and the like on their output amplitude whereas their frequency and/or phase characteristics are not so greatly effected.

In the preferred embodiment, the output $F_o$ of transceiver 16 is coupled back through to transceiver 14 via operational amplifier 36 to maintain oscillation of cylinder 12 at its natural resonant frequency as determined by the stress applied to it by the fluid therein. In that way, the output of transceiver 16 will be a signal which is at all times reflective of the pressure within cylinder 12.

Transducer 10 could be manufactured so as to form an integral part of tubing 22, 24 or may be removable such as by Leur locks (not shown). Mating Leur Locks (not shown) could be provided on caps 18, 20 and tubing 22, 24, respectively. A transducer in accordance with the foregoing has been constructed of brass and was found to operate quite satisfactorily. However, it is believed that materials such as Invar or glass and the like are preferable in that their natural resonant frequency is insensitive to temperature and hence not prone to noticeable changes over the wide range of temperature changes which may be encountered in a medical environment such as an ambulance, for example.

To provide electrical isolation, as well as physical isolation, the entire transducer is preferably coated inside and out with a plastic compatible with saline and the temperatures and chemicals encountered during sterilization. If cylinder 12 is metallic, coating the inner surface of cylinder 12 is necessary to provide electrical isolation. If glass or ceramic, the coating is necessary to prevent the possibility of pieces entering the saline fluid stream, and hence the patient's vein, in the event that cylinder 12 is damaged. Also, screens could be used.

With reference to FIGS. 3 and 4A-4C, there are disclosed several alternative embodiments of a pressure transducer according to the present invention. With respect to these alternative embodiments, the cylinder 12 is replaced with a plate 50 as shown in FIG. 5. Adhesively applied to opposite sides of plate 50 are the piezoelectric transceivers 14, 16 as discussed above. Although plate 50 is substituted for cylinder 12 as the structural member, operationally, the two are identical, i.e., as the stress on plate 50 varies, its natural resonant frequency will vary. Transceivers 14, 16 are applied to plate 50 so as to energize plate 50 into oscillation and to receive the oscillations therefrom and convert them to an electric signal proportional to the stress on plate 50 just as with cylinder 12. However, the embodiments shown in FIGS. 3, 4A, 4B and 4C differ from the embodiment of FIG. 1 primarily in that the fluid within conduits 22, 24 is not passed through the structural member of the sensor such as was done with cylinder 12. Rather, fluid pressure is mechanically coupled to an edge or the surface of plate 50 to vary the stress thereon.

For example, as shown in FIG. 3, a reusable dome 52 is provided with Leur locks 54 and a diaphragm 56 as shown in aforesaid U.S. Pat. No. 4,252,126. Leur locks 54 are to be coupled to a saline line such as aforesaid tubes 22, 24. Thus, dome 52 is inserted in line with tubing 22, 24 of FIG. 1 in place of cylinder 12 and end caps 16, 18 of the preferred transducer 10. Plate 50 is mounted to a mating structure 58 which is received into dome 52 on the diaphragm side thereof. One width-wise edge 60 of plate 50 is driven against diaphragm 56 such that as the pressure within dome 52 varies, diaphragm 56 will move towards or away from edge 60 of plate 50 thus varying the tension on plate 50. In order to better seat plate 50 against diaphragm 56, diaphragm 56 has adhered to it a plate spring 66 having a notch 67 into which width-wise edge 60 of plate 50 will fit. The opposite width-wise edge 61 of plate 50 is secured to a calibrated support structure 59 which is formed into housing structure 58. Calibrated support structure 59 is provided to permit adjustment of the lateral position of plate 50 relative to diaphragm 56 thereby varying the stress on plate 50 from diaphragm 56. With the conduit at atmospheric pressure (one end of the dome exposed to air), the position of plate 50 is adjusted to cause plate 50 to oscillate at a natural resonant frequency corresponding to air pressure, hence, zeroing the transducer.

With the transducer embodiment of FIG. 3, structure 58 would be affixed to dome 52 at the factory. After use, the entire assembly (dome 52 and structure 58) would be disposed of. Alternatively, structure 58 could include a top (not shown) with a diaphragm (not shown) coupled to edge 60 of plate 50 such as by a plate spring like plate spring 66. The top (not shown) could be threaded to be threadably received into mating threads formed into dome 52. Once received into dome 52, the diaphragm (not shown) on structure 58 would come into intimate contact with diaphragm 56 (plate spring 66 would be removed from diaphragm 56 in this alternative embodiment). Flexing of diaphragm 56 caused by fluid pressure within dome 52 would thus also cause the diaphragm (not shown) on structure 58 to flex thereby varying the stress on plate 50. With this alternative embodiment, the housing 58 including plate 50 could be reused and only the dome 52 disposed of after use.

The embodiment shown in FIG. 3 is more sensitive to temperature variations and is extremely sensitive to physical variations in construction and the like.

FIGS. 4A-4C disclose even further alternative embodiments of the pressure transducer of this invention employing the plate 50 of FIG. 5. The embodiments of FIGS. 4A-4C operate on the Bourdon tube principle. Utilizing that principal, in FIGS. 4A-4C, the tube 24 (or 22) which forms part of the saline hydraulic conduit is adhered lengthwise to one surface 62 of the plate 50. As pressure within tube 24 increases, the tube will tend to stress or cause curvature of plate 50. As a result, the frequency of oscillation of plate 50 will vary with the pressure.

Tube 24 in FIG. 4A is a PVC hardwalled tube such as commonly employed in the hydraulically coupled saline solution tubing 22, 24. The hardwalled PVC is accurate but has low resolution in that the range of frequency change is too small over the range of pressures involved in monitoring blood pressure, i.e., changes of one mmHg.

Tube 22 of FIG. 4B is similarly a stiff, or hardwalled, PVC. However, here, tube 22 is not cylindrical but is formed as a chord of a circle (e.g., a half-moon) with its flat surface 63 mounted to surface 62 of plate 50. The embodiment of FIG. 4B is slightly better than that of FIG. 4A in that it has greater resolution, but still not enough to cover the pressure range of interest in connection with blood pressure monitoring.

Finally, tube 22 or 24 of FIG. 4C is a thin polyethylene or cellophane, flexible tube. The embodiment of FIG. 4C has very good resolution but its accuracy is very low as the elasticity of the material affects its dynamic behavior.

Plate 50 is preferably a flexible member but may be any generally elongated material. Preferably, plate 50 should be curved so as to insure that an applied force will bend the member in a fixed direction. However, in the embodiments of FIG. 3 and FIGS. 4A-4C, plate 50 can initially be an uncurved plate although in the embodiment of FIG. 3, as appropriate pressure is applied in interlocking structure 58 to dome 52 and zeroing the transducer, some curvature is likely to result.

With respect to both plate 50 and cylinder 12, the shape is preferably one which encourages one mode of vibration substantially over all others. The natural resonant frequency (at atmospheric pressure) of cylinder 12 will be determined primarily by its shape, length, and thickness of its walls. Similarly, the natural resonant frequency (at atmospheric pressure) of plate 50 will be determined by its length, width and shape. In any event, with respect to plate 50, the ratio of the length should be such as to not encourage oscillation in the width direction.

Plate 50 is usually spring or carbon steel but may also be selected from other materials, for example, other metals or metal alloys, plastics, hard rubber, bi-metallic or other laminated material, and the like capable of oscillating in substantially one mode of vibration. Such materials may also be used for cylinder 12 although, as mentioned, glass or Invar is preferred. For example, cylinder 12 may be a glass cylinder 7 mm in diameter, 2 in. long and having a wall thickness of 0.1 mm. Use of such stiff material as brass glass, Invar, or other resilient, stiff material also provides a conduit which will not vary perceptibly in cross-sectional area. Hence, in use, the AAMI Standards relating to maximum displacement may be easily satisfied by a preferred transducer according to the principles of the present invention.

One embodiment of the present preferred form of the invention has been built utilizing a brass tube wherein end caps 18, 20 were soldered to cylinder 12 and tubes 22, 24 frictionally received into holes in end caps 18, 20. The frequency of operation of transducer 10 with the brass-tube as constructed was from 1997 Hz to 2027 Hz corresponding to 0 mmHg to 300 mmHg, respectively. With a brass tube, temperature compensation in the order of 4 mmHg/°C. is needed. However, glass is 1/11 as sensitive. Hence, temperature compensation is not expected to be necessary given that a wide temperature fluctuation will result in errors of only a few mmHg. In connection with blood pressure monitoring, that slight error is not likely to be significant. Even where temperature compensation is needed, the use of a second transducer 10 coupled to ambient pressure may be employed cost effectively to offset the affects of temperature as is well understood.

The material for cylinder 12 or plate 50 must have a high spring force with respect to its overall mass and should be capable of carrying a clean resonance relatively free of harmonics when oscillating. Oscillation in plate 50 or cylinder 12 must be capable of being mechanically induced by the vibrations of a piezoelectric resin transducer in contact therewith.

Various prior devices have been known to measure the vibration of bodies. Those wherein the structural member has been caused to vibrate and the vibration detected by an electrical transceiver have utilized ceramic or quartz type piezoelectric materials or electromagnetic transceivers. The various devices utilizing ceramic or quartz type piezoelectric materials have a disadvantage in that the materials are inherently self resonant and, consequently grossly reduce the accuracy of displacement in the force transducer system. Electromagnetic systems are also subject to the problem of self resonance but their main disadvantage is in the increased power required because of their inherently low impedance.

Thus, in accordance with the present invention, the transceivers are comprised of piezoelectric resin sheet material. Piezo film is less costly than strain gauges and is easier to work with. Unfortunately, unlike strain gauges, piezo film does not provide a steady output signal or resistance, proportional to pressure applied to a surface. Instead, when pressure is applied to it, piezo film generates an electrical impulse that decays in a short period of time. Further, piezo film's amplitude output is extremely sensitive to temperature variations. Thus, piezo film is not generally useful to provide an indication of the amount of displacement as would be necessary in the present invention. However, piezo film, if coupled to a vibrating surface, such as is shown in U.S. Pat. No. 3,903,733, can provide an AC signal which is proportional to the vibrations of the surface and is stable with respect to temperature.

The present invention utilizes the AC phenomena of piezo resin film to both energize oscillation of the structural member as well as to sense oscillation. Further, the specific nature of the present invention places the structural member in an environment wherein its natural resonant frequency varies linearly with respect to pressure thus producing a reliable and easily monitored pressure transducer.

Piezoelectric resin sheets 30 are preferably electrically polarized thermoplastic, thermosettable or curable resins capable of holding a stable piezoelectric charge. Examples of such resins taught in the prior art to be useful as piezoelectrics include polyesters, polyolefins, polyamides, poly(amino acids), polycarbonates, various cellulose derivatives, polyvinyl acetate, polystyrene, polyacrylonitriles, polyacrylates, polusulfones, polyvinylidene cyanide and poly(halogenated olefins) e.g., vinylidene fluoride polymers, vinylidene chloride polymers, vinyl chloride polymers, vinyl fluoride polymers, tetrafluoroethylene polymers, chlorotrifluoreothylene polymers and the like. Such polymers include homopolymers and copolymers or terpolymers or the resins as well as resin mixtures or blends. Preferred resins for the formation of piezoelectric elements are those nonelastomeric resins containing at least a major mole proportion of vinylidene fluoride in the polymer chain including, for example, vinylidene fluoride homopolymer and copolymers or terpolymers of at least 65 mol percent of vinylidene fluoride and at least one other copolymerizable monomer which preferably includes trifluoroethylene tetrafluoroethylene or vinyl fluoride. Vinylidene fluoride resins are conventionally produced by either suspension or emulsion polymerization procedures.

Extruded resin films or sheets may be unoriented but are preferably monoaxially oriented, biaxially oriented or multiaxially oriented by conventional means including blowing, stretching, rolling and combinations of these techniques. Resin films may be solvent cast either as unsupported articles or directly upon the flexible member which has first been treated by etching to effect firm bonding.

While it is expected that most piezoresistive, piezoceramic composites, and piezopolymer films will work, the preferred resin film is a piezo film marketed by Pennwalt under the trademark KYNAR. KYNAR piezo film is a polyvinylidene fluoride (PVDF).

A typical piezoelectric resin transducer comprises a poled, uniaxially oriented poly(vinylidene fluoride) resin film having a thickness of between 8 to 200 microns and an aluminum coating of a thickness ranging from 500 to 1500 Angstroms deposited thereon. Preferably, resin sheet 30 is 60 microns thick although it could be as thin as 28 microns. The poled film will typically demonstrate strain coefficients $d_{31}$, $d_{32}$ and $d_{33}$, respectively, of at least 30, 3 and −25 micrometers/volt. Piezoelectric-forming vinylidene fluoride polymers have extremely wide band, wide dynamic range material with low electric loss and, therefore, are easy to control in electrical circuits that require high accuracy.

Films and sheets of the piezoelectric resins are usually coated on one or both sides with conductive materials e.g., aluminum, zinc, gold, tin, chrome, nickel and the like by vapor deposition, electroplating, painting, sputtering, laminating and the like.

The attachment of the piezoelectric transceivers 14, 16 to the structural member 12 or 50 is readily accomplished by adhesive means such as two-sided adhesive tape, liquid adhesive or the like. If desired, insulating sheets can be fixedly mounted between the flexible member 12 or 50 and the piezoelectric transducers 14 and 16 in a conventional manner. With this insulation arrangement, the ungrounded leads from transducers 14 and 16 may be located on the inner coatings 31 adjacent the outer surface of cylinder 12.

Figure 6:
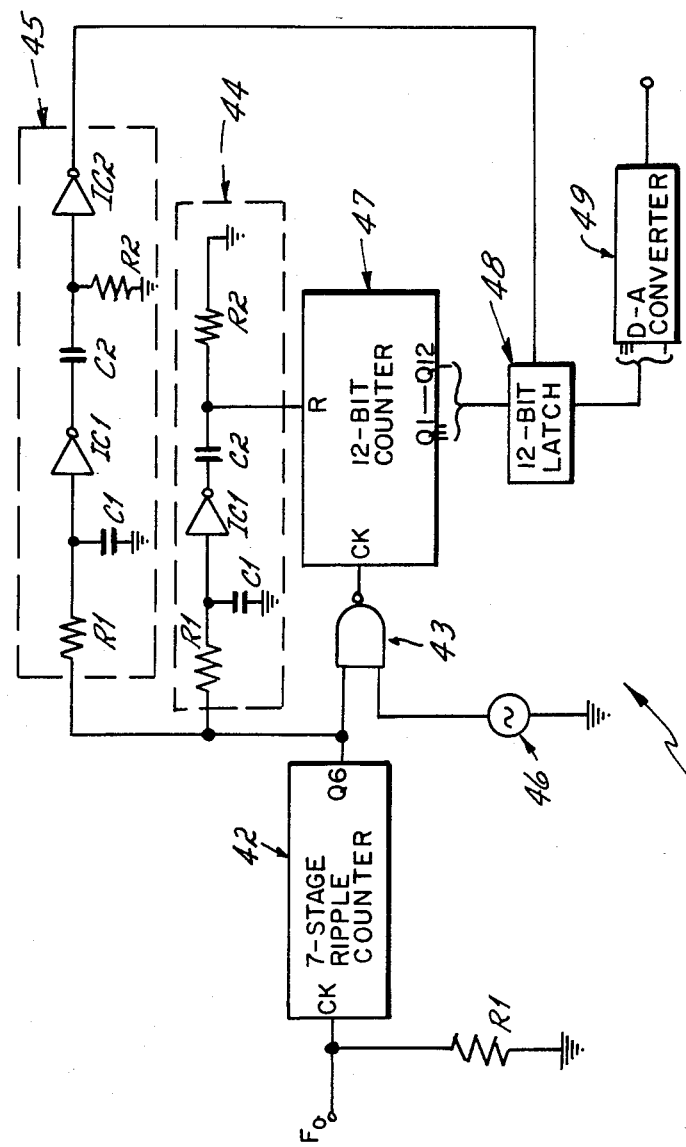
FIG. 6 is a schematic diagram of a preferred electrical circuit for use with the transducers of the present invention.

With reference to FIG. 6, there is shown a circuit block diagram of the circuitry 40 which may be employed to provide an electrical signal to a commercially available monitor (not shown) from which medical personnel can be provided a reading of the patient's blood pressure. Circuitry 40 was constructed and powered by ±15 volts power supplies (not shown). Commercial monitors have power outlets available and circuitry 40 is preferably adapted to be powered therefrom. For example, with C-MOS or H-MOS, the power supply levels can be much less than ±15 volts down to only a few volts. The circuitry 40 also includes a common ground to be compatible with most commercial monitors.

The output $F_o$ of transceiver 16 on its output wire 34 is coupled to ground through a 100 kilohm resistor R1 and to the clock input of a 7-stage ripple counter 42. The sixth stage or Q6 output of counter 42 is coupled to one input of NAND gate 43 and to pulse circuitry 44, 45. A clock 46 is coupled to the other input of NAND gate 43.

The output of NAND gate 43 is coupled to the clock input of a 12-bit counter 47. The frequency of clock 46 causes 12-bit counter 47 to continually count over a period of time as determined by 7-stage ripple counter 42 which, in turn, is controlled by the frequency of vibration of tube 12. After that time period runs, the 12 outputs of 12-bit counter 47 are coupled to 12-bit latch 48 whereupon pulser 45 latches latch 48 to store the count and thereafter pulser 44 resets counter 47 for the next count. The 12 outputs of latch 48 are coupled to ladder-type digital-to-analog (D-A) converter 49 or other available D-A converter. Alternatively, a different stage of 7-stage ripple counter 42 could be used to determine the time period for clocking counter 47. As the clocking or sampling period increases (e.g. by a factor of two if the Q5 output (not shown) is used rather than the Q6 output of counter 42), the resolution decreases (e.g. by a factor of two), and vice versa. That is, with the circuit 40 as shown in FIG. 6, data update occurs at the rate of approximately 120 samples per second. Use of the Q5 output results in a sampling rate of approximately 240 samples per second meaning that fewr pulses from clock 46 are counted per sampling period than with circuit 40 configured as shown.

D-A converter 49 provides an analog or DC voltage signal which is proportional to the frequency of oscillations of cylinder 12. As stated earlier, the natural resonant frequency of cylinder 12 varies nearly linearly with pressure. Hence, the analog output from D-A converter 49 will be essentially linearly proportional to the frequency of oscillation of cylinder 12, and, thus, the pressure therein. The output of D-A converter 49 is preferably adapted to drive a 600 ohm impedance to be compatible with many commercial monitors. The transducer 10 and circuit 40 cooperate to provide a 5μ V/V/mmHg sensitivity, i.e., for each one volt of excitation to transceiver 14 from a power supply (not shown), the output of D-A converter 49 will be 5μ V for each mmHg. Thus, assuming 6.0 volts excitation, the output of D-A converter is 0 V (=0 mmHg) to 9 mV (=300 mmHg).

The output of counter 42 is coupled to inverter IC1 at the junction of grounded series branch comprised of 100 kilohm resistor R1 and 2200 picofarad capacitor C1. The output of inverter IC1 is coupled to the reset input of counter 47 at the junction of grounded series branch comprised of 420 picofarad capacitor C2 and 22 kilohm resistor R2. Pulser 45 is constructed in a fashion similar to pulser 44 but the value of capacitor C1 is reduced to 470 picofarads to reduce the pulse width out of pulser 45 as compared to the output of pulser 44. In that way, latch 48 will be clocked before counter 12 is reset. Pulser 45 further includes a second inverter IC2 to present the correct clock edge required by latch 48 to clock or latch the output of counter 47 into latches 48 for the D-A conversion process.

In operation as a blood pressure monitoring device, the cylinder 12 of the preferred embodiment is interposed between respective portions 22, 24 of the saline conduit which is hydraulically coupled to the patient's veins (not shown) as above described. Because of the hydraulical coupling between the tube 24 and the patient's vein (not shown), the frequency of oscillation of cylinder 12 will vary according to the patient's blood pressure. In that way, a commercial monitor (not shown) which has been interconnected to the output of the circuitry of FIG. 6, the input of which has been coupled to transducer 10, will provide medical personnel with the read-out of the patient's blood pressure at any given time.

The invention has been described in connection with blood pressure measurement. However, it is also expected to be useful in connection with an intracranial pressure regulating system such as that disclosed in U.S. patent application Ser. No. 613,314 filed May 23, 1984, by Steven R. Loveland, entitled "Intracranial Pressure Regulating System" and assigned to the assignee herein, Medex, Inc.

Having described the invention, what is claimed is:

1. In a system for measuring bodily fluid pressure, a transducer connectable to a dome containing fluid under pressure, said fluid under pressure being hydraulically coupled to the source of said bodily fluid, said dome having a first diaphragm which flexes in response to variations in fluid pressure, said transducer comprising:

a housing connectable to said dome;
a plate having at least one natural resonant frequency which varies as mechanical stress applied to it varies;
means for connecting said plate between said housing and said first diaphragm to apply varying stress to said plate as said first diaphragm flexes;
a pair of piezoelectric sheet transceivers, each in intimate contact with a respective portion of said plate;

electronic means for energizing one of said piezoelectric transceivers to vibrate said plate at its resonant frequency; and said other piezoelectric transducer producing a signal proportional to the frequency of vibrations of said plate, said signal thereby being indicative of said bodily fluid pressure.

2. In the system of claim 1, said pair of piezoelectric sheet transceivers being on opposite sides of said plate.

3. In the system of claim 1, said connecting means including a second diaphragm at one end of said housing to contact said first diaphragm and flex therewith.

4. A transducer for measuring bodily fluid by monitoring fluid pressure within a conduit, the conduit fluid being hydraulically coupled to the bodily fluid whereby the conduit fluid pressure is proportional to the bodily fluid pressure, the transducer comprising:

a structural member having at least one natural resonant frequency which varies as mechanical stress applied to it varies;

means for connecting said structural member to said conduit to apply a stress to said structural member proportional to the fluid pressure within said conduit thereby varying said member's natural resonant frequency;

a pair of piezoelectric sheet transceivers, each in intimate contact with a respective portion of said structural member;

electronic means for energizing one of said piezoelectric transceivers to vibrate said structural member at its resonant frequency; and said other piezoelectric transceiver producing a signal proportional to the frequency of vibrations of said structural member, said signal thereby being indicative of said pressure within said conduit.

5. The pressure transducer of claim 4, said structural member being tubular and interposed between respective portions of said conduit to permit fluid communication through said structural member and between said respective portions of said conduit.

6. The pressure transducer of claim 4, said structural member being positioned exteriorly of said conduit and with a portion of said structural member being coupled to an exterior portion of said conduit.

7. The pressure transducer of claim 6, said exterior conduit portion being a diaphragm.

8. The pressure transducer of claim 6, said structural member being a plate having at least one surface, said coupled portion of said structural member being a portion of said surface.

9. The pressure transducer of claim 4, said electronic means further including means for coupling said other piezoelectric transceiver signal to said one piezoelectric transceiver to maintain said vibration of said structural member.

10. The pressure transducer of claim 9 further including circuit means responsive to said other piezoelectric transceiver signal to provide a DC voltage output corresponding to said pressure within said conduit.

11. In a system for measuring bodily fluid pressure, apparatus comprising:

a tube whose resonant frequency varies with the pressure of fluid within the tube;

means for passing fluid hydraulically coupled to the bodily fluid to be measured through the tube;

two active piezoelectric films disposed in intimate contact with said tube on opposite sides thereof;

first electronic means for energizing the first of said films to cause said tube to resonate at its natural frequency; and second electronic means connected to the other of said films to monitor said frequency.

12. In the system of claim 11, said monitored frequency being coupled to said first film through said first electronic means to cause said tube to continually resonate at its natural frequency.

13. In the system of claim 12, said second electronic means providing a DC voltage output corresponding to said fluid pressure.

14. The transducer of claim 5, the tubular structural member being generally circular in cross-section.

15. In the system of claim 11, the tube being generally circular in cross-section.

16. In the system of claim 15, said monitored frequency being coupled to said first film through said first electronic means to cause said tube to continually resonate at its natural frequency.

17. In the system of claim 16, said second electronic means providing a DC voltage output corresponding to said fluid pressure.

18. In the system of claim 11, the films being disposed on exterior sides of the tube.

19. In the system of claim 15, the films being disposed on exterior sides of the tube.

20. In the system of claim 11, the tube being generally free to vibrate free of a stable reference mount.

* * * * *